United States Patent [19]

Kaufman

[11] Patent Number: 6,035,018
[45] Date of Patent: Mar. 7, 2000

[54] ACCESS, SELECTION, AND DOWNLOADING OF A PRE-RECORDED OUTGOING GREETING MESSAGE FOR A VOICE MESSAGING SYSTEM FROM AN EXTERNAL SOURCE

[75] Inventor: Steven B. Kaufman, Bridgewater, N.J.

[73] Assignee: Lucent Technologies Inc., Murray Hill, N.J.

[21] Appl. No.: 09/184,745

[22] Filed: Nov. 3, 1998

[51] Int. Cl.$^7$ .................................................. H04M 1/64
[52] U.S. Cl. ................... 379/88.17; 379/88.25; 379/88.28
[58] Field of Search ................. 379/76, 88.17, 379/88.25, 88.28, 265, 214

[56] References Cited

U.S. PATENT DOCUMENTS

| | | | |
|---|---|---|---|
| 4,920,558 | 4/1990 | Hird et al. | 379/88.22 |
| 4,939,773 | 7/1990 | Katz | 379/204 |
| 5,007,077 | 4/1991 | Fields et al. | 379/88.23 |
| 5,063,698 | 11/1991 | Johnson et al. | 40/124.03 |
| 5,425,078 | 6/1995 | Stern | 379/88.23 |
| 5,444,767 | 8/1995 | Goetcheus et al. | 379/67.1 |
| 5,528,672 | 6/1996 | Wert | 379/93.22 |
| 5,539,818 | 7/1996 | Zdenek et al. | 379/265 |
| 5,544,232 | 8/1996 | Baker et al. | 379/88.25 |
| 5,555,291 | 9/1996 | Inniss et al. | 379/88.13 |
| 5,592,537 | 1/1997 | Moen | 379/88.11 |
| 5,719,920 | 2/1998 | Harman | 379/88.07 |
| 5,729,593 | 3/1998 | Baker et al. | 379/88.19 |
| 5,787,151 | 7/1998 | Nakatsu et al. | 379/88.23 |
| 5,832,062 | 7/1998 | Drake | 379/88.01 |

OTHER PUBLICATIONS

Fehn et al., Capitel V2.10, ISDN CAPI based Answ. Mach.for OS/2, Win95, & WinNT, [online], [retrieved May 5, 1999]. Retrieved from Internet:<URL:http://www.2tec3com/>, Jun. 1997.

Sound America Spoofs Answering Machine [online]. LinkAmerica Comm., Inc., [retrieved May 6, 1999]. Retrieved from Internet: <URL:soundamerica.com/sounds/spoofs>, Mar. 1998.

Audio Store Telephone Answering Messages [online], Singing Drum Web Design, [retrieved May 6, 1999]. Retrieved from Internet: <URL:www.singingdrum.com/sound3.html>, Aug. 1996.

Answering Machine Audio [online], Tyrant Technologies, [retrieved May 6, 1999], Retrieved from Internet: <URL:www.geocities.com/SiliconValley/Pines/6030/intro.htm>, Feb. 1997.

*Primary Examiner*—Daniel S. Hunter
*Assistant Examiner*—Roland G. Foster

[57] ABSTRACT

A telephone voice messaging system and method for accessing, selecting, and downloading a pre-recorded outgoing voice message from an external source. The pre-recorded outgoing greeting messages may be downloaded in digital format using a modem, or in audible, analog format. In digital format, the pre-recorded outgoing greeting messages may be selected from a server through the public switched telephone network, and/or using the Internet.

29 Claims, 7 Drawing Sheets

ACCESS, SELECTION, AND DOWNLOADING OF A PRE-RECORDED OUTGOING GREETING MESSAGE FOR A VOICE MESSAGING SYSTEM FROM AN EXTERNAL SOURCE

BACKGROUND OF THE INVENTION

1. Field of the Invention

This invention relates generally to a telephone voice messaging system which allows a user to download a pre-recorded outgoing greeting message. More particularly, it relates to a telephone voice messaging system which allows a user to access, select, and download a pre-recorded outgoing greeting message from an external source.

2. Background of Related Art

Telephone voice messaging systems, e.g., telephone answering devices (i.e., answering machines) are useful devices for both the home and office environments. A conventional telephone answering device generally operates on a single telephone line and answers an incoming call of a calling party to an unused (i.e., on-hook) telephone after a desired number of rings. The telephone answering device causes the telephone line to enter an off-hook condition, then plays an outgoing greeting message to the calling party. After the outgoing greeting message has played in its entirety, the calling party can leave a voice message on the telephone answering device. At a later time, the voice message is replayed by the user, depending on the features of the telephone answering device, either local to the telephone answering device or via remote connection from another telephone.

Figure 7:
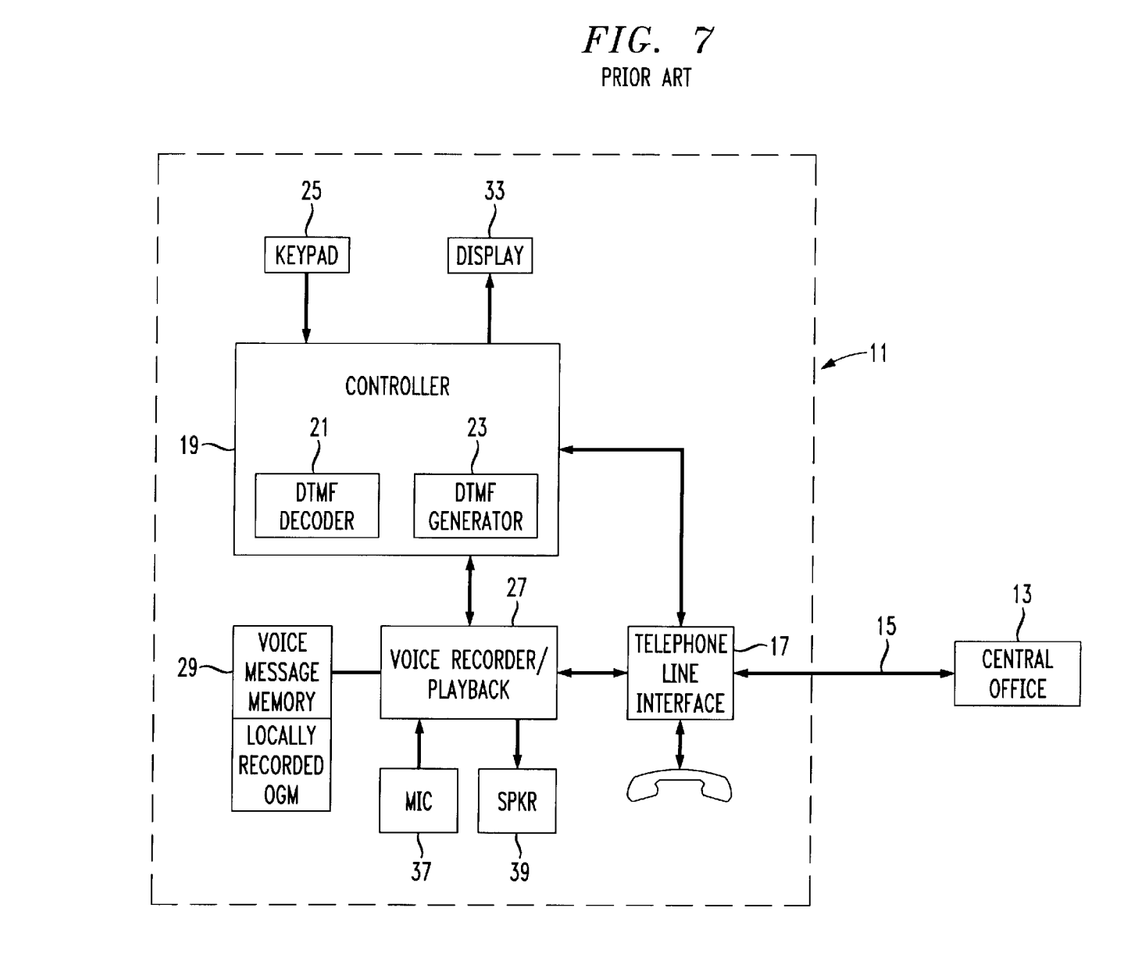
FIG. 7 illustrates a conventional telephone answering device having only locally recorded outgoing greeting message capability.

FIG. 7 illustrates a conventional telephone answering device capable of answering an incoming telephone call on a telephone line and including the capability to locally record an outgoing greeting message.

In FIG. 7, a telephone answering device 11 is connected to a telephone company central office 13 via a telephone line 15. A telephone line interface (TLI) 17 in the telephone answering device 11 provides the conventional isolation, DC and AC impedance as required by telephone company standards. The telephone line interface 17 also provides a ring detect signal to a controller 19. The ring detect signal indicates to the controller 19 the ringing of an incoming call on the telephone line 15. The controller 19 can be any suitable processor, e.g., a microprocessor, a microcontroller, or a digital signal processor (DSP). Furthermore, the controller 19 includes a dual tone multi frequency (DTMF) decoder 21 and a DTMF generator 23 to detect and generate control signals from a keypad 25 relating to the outgoing telephone call.

The user can locally record an outgoing greeting message into the conventional telephone answering device 11 through a microphone 37 connected to the voice recorder/playback audio module 27. The locally recorded outgoing greeting message is stored in voice message memory 29 or other non-volatile location, and is played to the calling party when the telephone line is initially answered.

After a desired number of ring signals, the telephone answering device 11 causes the telephone line interface 17 to place the telephone line 15 in an off-hook state, and instructs a voice recorder/playback audio module 27 to play a pre-recorded outgoing greeting message on the telephone line 15 to the calling party. Upon completion of the outgoing greeting message being played to the calling party, the calling party can leave a voice message in the voice message memory 29 under the control of the controller 19.

A keypad 25 allows the user to select various modes of operation, including the playback of voice messages through a speaker 39 connected to the voice recorder/playback audio module 27, while the display 33 is capable of displaying a status of the various modes.

The conventional telephone answering device 11 is typically limited to the use of outgoing greeting messages which are either pre-stored at the factory or locally recorded by the user of the telephone answering device 11. For example, the outgoing greeting message can be recorded local to the telephone answering device 11 by the user, when the telephone answering device 11 is not in telephonic use, by speaking the outgoing greeting message into the microphone 37.

However, some users of telephone answering devices may not prefer to record their own outgoing greeting message. For instance, a foreign speaking user may have difficulty in some cases clearly articulating certain words in a language foreign to them when locally recording an outgoing greeting message, or may have too strong an accent to allow easy understanding by some callers. Moreover, a person may want to convey the image to all callers that others are in the household, e.g., for security reasons. Thus, some telephone answering devices 11 provide pre-recorded outgoing greeting messages. Unfortunately, while pre-recorded outgoing greeting messages may provide a clearly articulated message, the user typically does not have much choice in choosing the specific content of the outgoing greeting message. This leads to little flexibility and customizability to the user.

Accordingly, there exists a need for an alternative to conventional choices for providing outgoing greeting messages from a voice messaging system such as a telephone answering device.

SUMMARY OF THE INVENTION

In accordance with the principles of the present invention, an outgoing greeting message module for a voice messaging system comprises a controller adapted to gain access over a telephone line to a plurality of pre-recorded outgoing greeting messages. An outgoing greeting message memory location is adapted to store a digital representation of a selected one of the pre-recorded outgoing greeting message. An outgoing greeting message download module is adapted to download the selected one of the plurality of pre-recorded outgoing greeting messages for storage in the outgoing greeting message memory location.

A method of accessing, selecting, and downloading a pre-recorded digital outgoing greeting message with a telephone voice messaging system from an external source in accordance with the principles of the present invention comprises accessing a plurality of pre-recorded outgoing greeting messages at the external source. One of the plurality of pre-recorded outgoing greeting messages at the external source are selected from the voice messaging system, and the selected outgoing greeting messages is downloaded from the server.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a method and apparatus for a telephone voice messaging system which is capable of downloading pre-recorded outgoing greeting messages from an external source, e.g., from the central office or from a web site on the Internet. This capability allows the user of a voice messaging system such as a telephone answering device to customize their outgoing greeting message, e.g., by choosing a greeting spoken by a celebrity, sports hero, etc. For security purposes, a younger person living alone may desire to choose an outgoing greeting message spoken by an authoritative sounding person or group of persons.

The outgoing greeting message may be selected by the user and downloaded in any appropriate format, e.g., in digital or analog format. For instance, the selected, pre-stored outgoing greeting message may be downloaded in digital format using a modem in a telephone answering device, or it may be downloaded in analog format while the selected, pre-stored outgoing greeting message is audibly played from an external source.

While the disclosed embodiments are described with respect to a telephone answering device, the principles of the present invention relate equally to voice messaging systems in general, including but not limited to a voice mail system commonly found in a private branch exchange (PBX) system.

Figure 1:
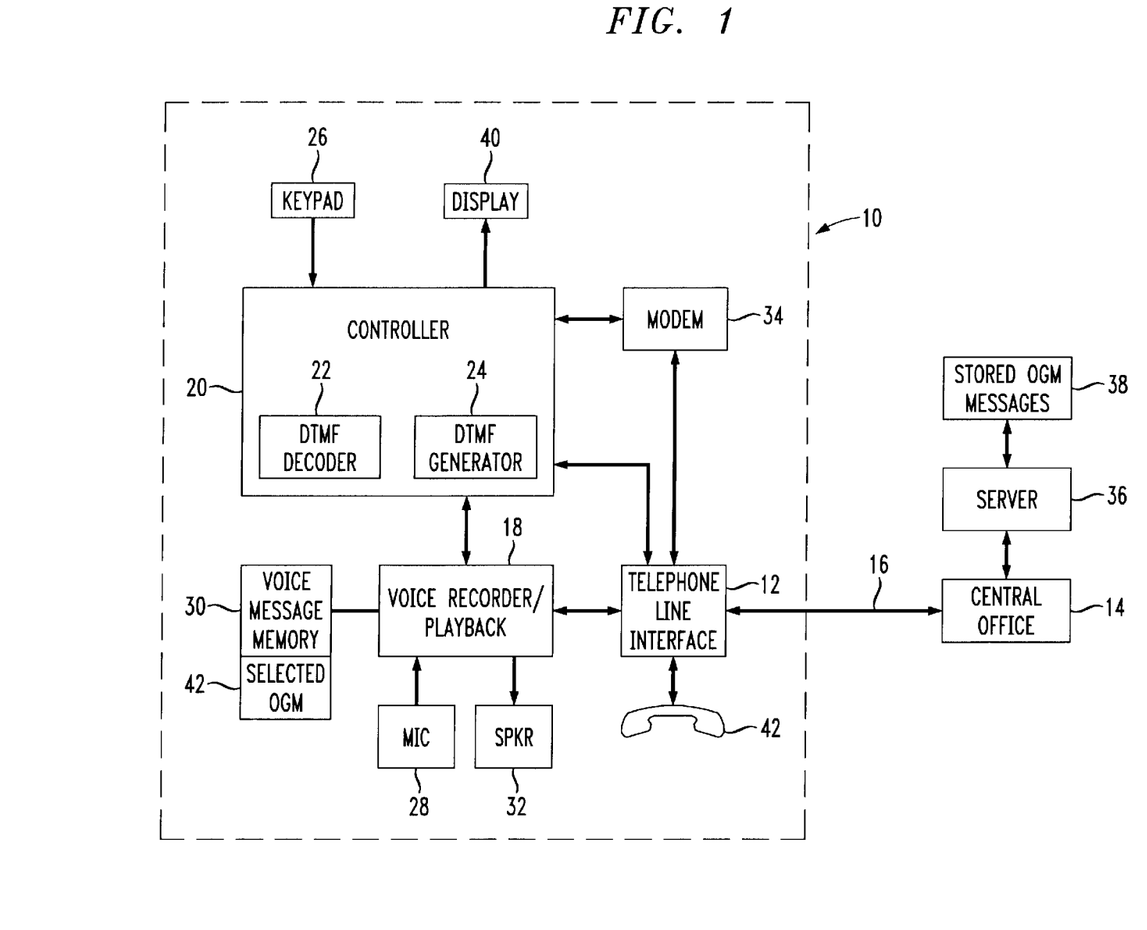
FIG. 1 is a block diagram illustrating a telephone answering device capable of accessing, selecting, and downloading a pre-stored outgoing greeting message in a data format from a telephone company or other third party provider constructed in accordance with the principles of the present invention.

FIG. 1 illustrates a telephone voice messaging system, such as a telephone answering device, indicated generally at 10, capable of allowing a user to access, select, and download an outgoing greeting message from an external source into storage in the telephone answering device 10.

In the embodiment of FIG. 1, the telephone answering device 10 includes at least one telephone line interface 12 for interconnection with a telephone company central office 14 via a telephone line 16. The telephone line interface 12 interconnects the telephone line 16 with a voice recorder/playback module 18. Furthermore, the telephone line interface 12 preferably interconnects the telephone line 16 with a controller 20. The controller 20 can be any suitable processor, e.g., a microprocessor, a digital signal processor, or a microcontroller.

The telephone answering device 10 of the present invention further includes a DTMF decoder 22 and a DTMF generator 24 implemented within the controller 20. The DTMF generator 24 may be a software module or separate component which generates control signals based on input from an alphanumeric keypad 26, e.g., relating to the dialed digits of an outgoing telephone call. The DTMF tones generated by the DTMF generator 24 are also preferably used to provide signaling to an external source to allow accessing, selecting, and downloading of a pre-recorded outgoing greeting message.

After a desired number of ring signals, the telephone answering device 10 causes the telephone line interface 12 to place the telephone line 16 in an off-hook state, and instructs the voice recorder/playback audio module 18 to play a locally pre-stored outgoing greeting message on the telephone line 16 to the calling party. The outgoing greeting message may be one which was recorded locally as in a conventional telephone answering device 10, i.e., using a microphone 28 connected to the voice recorder/playback audio module 18. However, in accordance with the principles of the present invention, the outgoing greeting message may instead be a locally stored copy of an outgoing greeting message downloaded from an external source.

The outgoing greeting message is stored in non-volatile voice message memory 30 and is retrieved by the voice recorder/playback module 18 in response to a call from a calling party. Upon completion of the outgoing greeting message being played to the calling party, the calling party can typically record a voice message for storage in the voice message memory 30 for later playback by the user of the telephone answering device 10 under the control of the controller 20.

The keypad 26 allows the user to instruct the controller 20 to select any appropriate mode of operation of the telephone answering device 10, e.g., the playback or erasure of stored voice messages through a speaker 32 connected to the voice recorder/playback audio module 18.

As illustrated in FIG. 1, the first embodiment of a telephone answering device in accordance with the principles of the present invention is capable of downloading an outgoing greeting message in a digital format. Accordingly, the telephone answering device 10 includes a modem 34 either incorporated within the telephone answering device 10 or external to the telephone answering device 10. In any event, the modem 34 is preferably in communication with the controller 20. The modem 34 allows digital data corresponding to a selected outgoing greeting message to be downloaded to the telephone answering device 10 from an external source.

In particular, a large number of pre-recorded outgoing greeting messages may be stored in an appropriate memory location 38 accessible by a server 36. The server 36 and stored outgoing greeting messages (OGM) 38 are accessed via the central office 14, which includes appropriate modem interfaces for completing the telephonic data connection between the server 36 and the telephone answering device 10.

The principles of the present invention can be applied to the construction of a customized outgoing greeting message using a desired voice. For instance, a database may be maintained at the server 36 containing a suitable vocabulary spoken by, e.g., a famous person or celebrity. The user of the telephone answering device 10 can request construction of a customized outgoing greeting message, either by prearranged written request with the service provider, by voice to text recognition of spoken words, or other means. The customized outgoing greeting message is constructed using the vocabulary database at the server 36 and downloaded to the telephone answering device 10.

Figure 2:
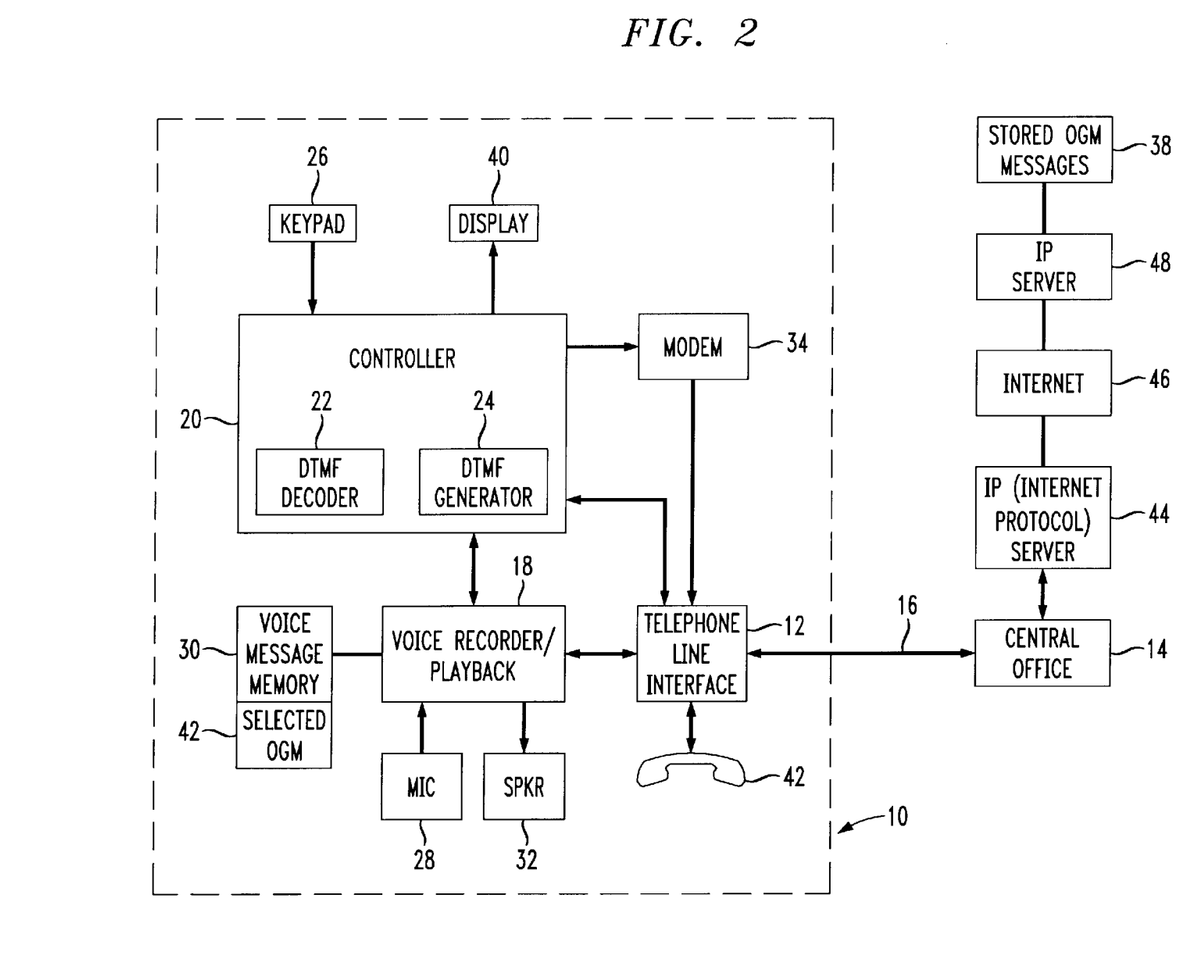
FIG. 2 is another block diagram illustrating a telephone answering device capable of accessing, selecting, and downloading a pre-stored outgoing greeting message in a data format from a web site on the Internet constructed in accordance with the principles of the present invention.

FIG. 2 shows another embodiment of a telephone answering device 10 constructed in accordance with the principles of the present invention.

In particular, FIG. 2 shows an interconnection via the Internet 46 to the pre-stored outgoing messages 38 serviced by an appropriate Internet Protocol (IP) server 48. In such an application, the telephone answering device 10 interconnects through the central office 14 to an appropriate Internet service provider having an IP server 44 and access to the Internet 46.

Figure 3:
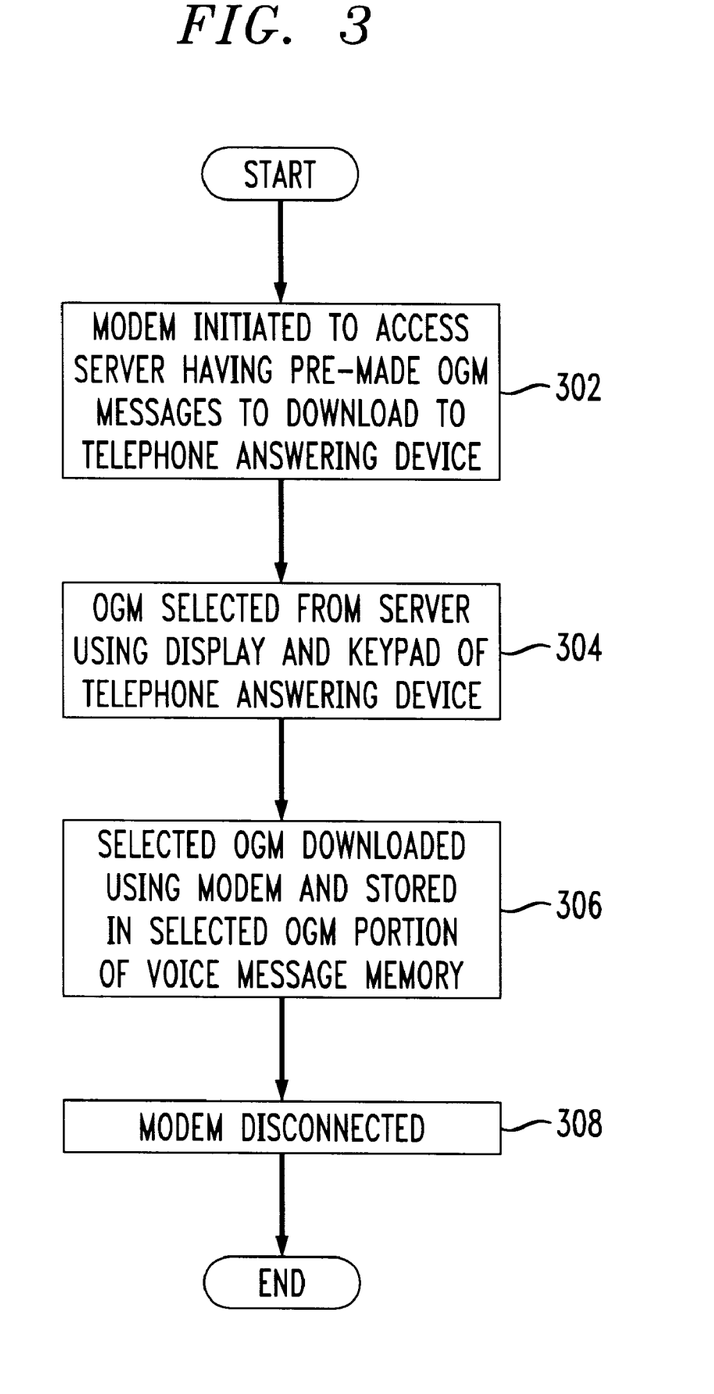
FIG. 3 is a flow chart illustrating a process by which the user of the telephone answering device of FIGS. 1 and 2 can access, select, and download a pre-stored outgoing greeting message in accordance with the principles of the present invention.

FIG. 3 shows a exemplary process of accessing, selecting, and downloading of a pre-recorded outgoing greeting message in digital format from an external source in accordance with the principles of the present invention.

In particular, in step 302, a controller in a telephone answering device 10 such as those shown in FIGS. 1 or 2 instructs a modem 34 to initiate a connection to a server having access to a plurality of pre-recorded outgoing greeting messages. This initiation may include the dialing of an appropriate telephone number as well as initial handshaking and other protocol matters. To activate the access to the external pre-recorded outgoing greeting messages, the user instructs the controller 20 to place the telephone answering device in an off-hook condition, e.g. by depressing a dedicated access button.

In step 304, a list of available pre-recorded messages are provided to the user of the telephone answering device 10 for display on the display 40, and for selection via the keyboard 26 or other keys on the telephone answering device 10.

In step 306, the selected outgoing greeting message is downloaded in digital format using the modem 34, and stored in an appropriate portion of the non-volatile voice message memory 30, e.g., in a selected outgoing greeting message portion 42 of the voice message memory 30.

In step 308, the modem 34 is disconnected and the selected outgoing greeting message is ready to play for any calling party to the telephone answering device 10.

Figure 4:
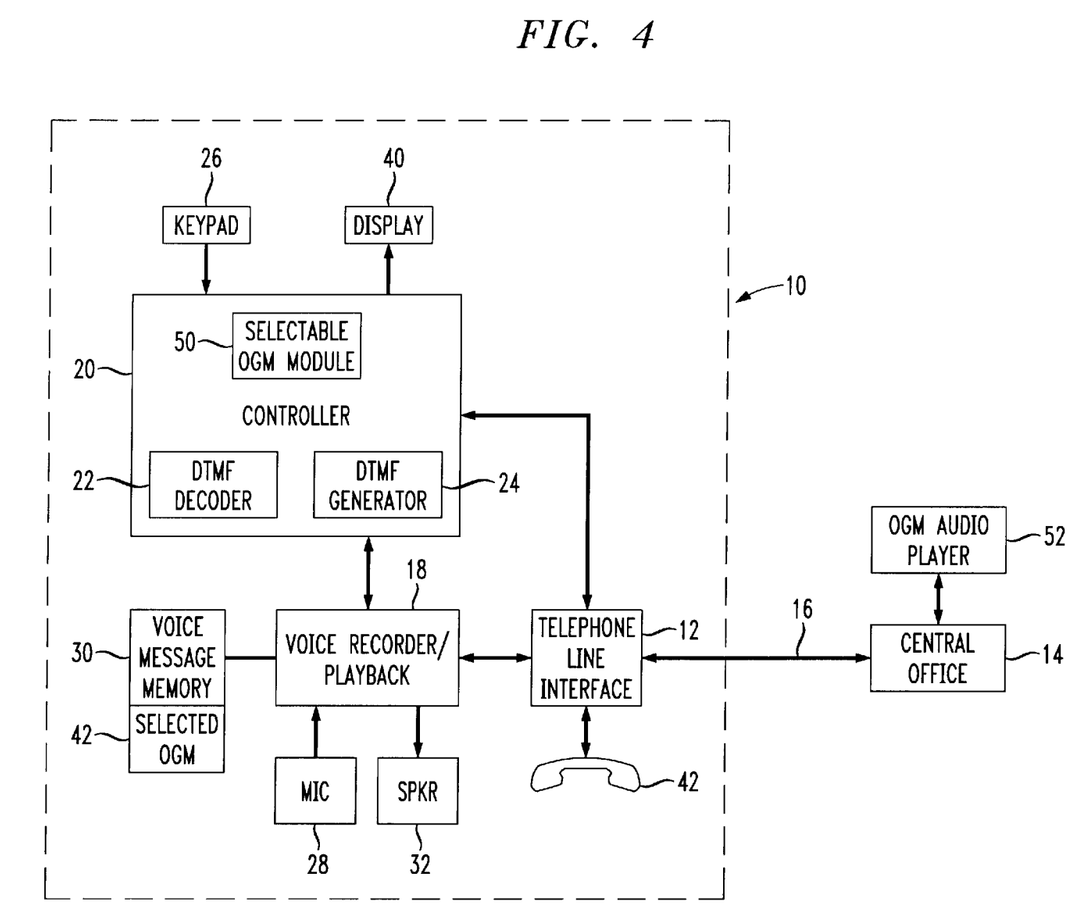
FIG. 4 is still another block diagram illustrating a telephone answering device capable of accessing, selecting, and downloading a pre-stored outgoing greeting message in an audio format from an outgoing greeting message audio player, constructed in accordance with the principles of the present invention.

FIG. 4 shows another embodiment of a telephone answering device 10 adapted to download a pre-recorded outgoing greeting message in analog format from an external source.

In particular, the controller 20 in the telephone answering device 10 is adapted to allow storage of a pre-recorded, externally played outgoing greeting message into an appropriate portion of its voice message memory 30, e.g., a selected outgoing greeting message portion 42. Upon appropriate selection of a desired outgoing greeting message by a user of the telephone answering device through a central office 14, a selected outgoing greeting message will be played over the telephone line 16 and appropriately recorded by the voice recorder/playback module 18.

As illustrated in FIG. 4, the selectable outgoing greeting message module 50 which allows selection and downloading of a pre-recorded outgoing greeting message from an external source is preferably a software module included within the program code of the controller 20.

Figure 5:
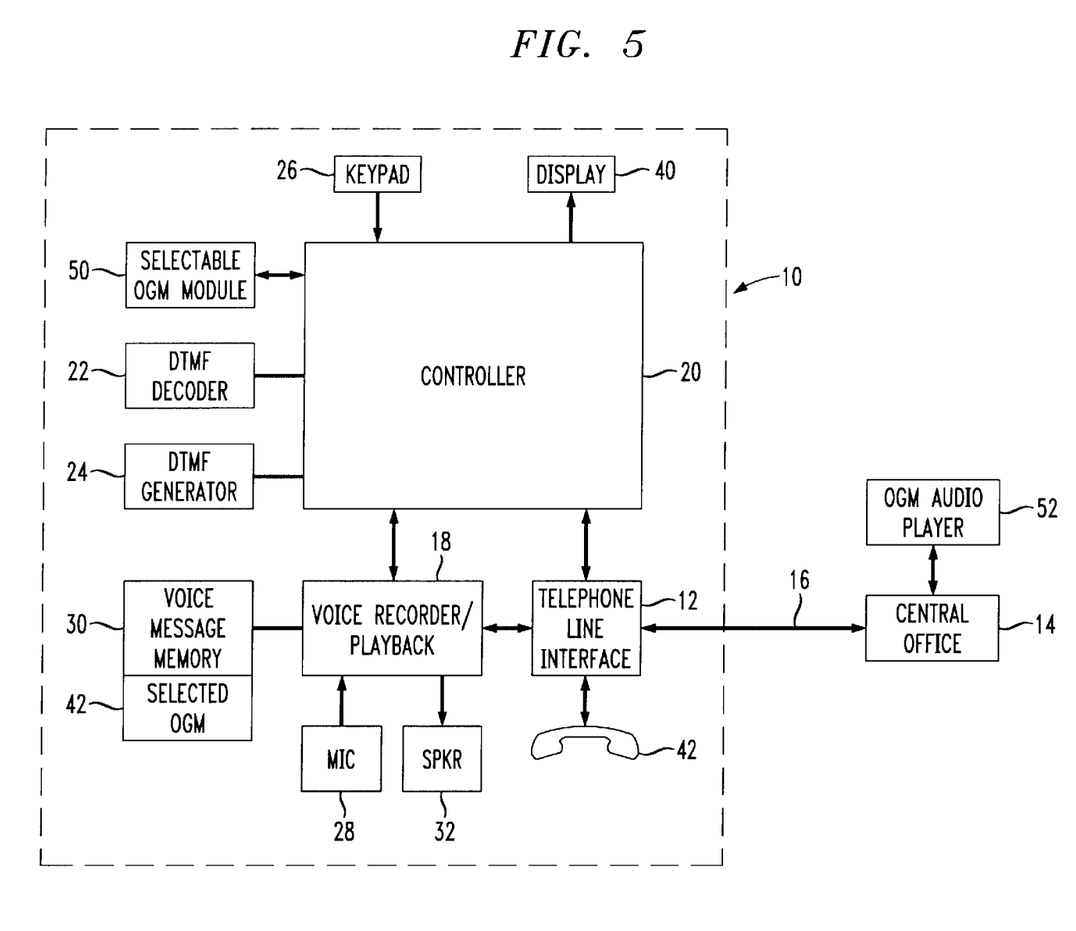
FIG. 5 is yet another block diagram illustrating a telephone answering device capable of accessing, selecting, and downloading a pre-stored outgoing greeting message in an audio format from an outgoing greeting message audio player, constructed in accordance with the present invention.

FIG. 5 shows that the selectable outgoing greeting message module 50 can be implemented separate from the controller 20, but regardless, will preferably be in communication with the controller 20. Moreover, FIG. 5 further shows that the DTMF decoder 22 and/or the DTMF generator 24 can be separate from the controller 20 but again preferably in communication with the controller 20.

Figure 6:
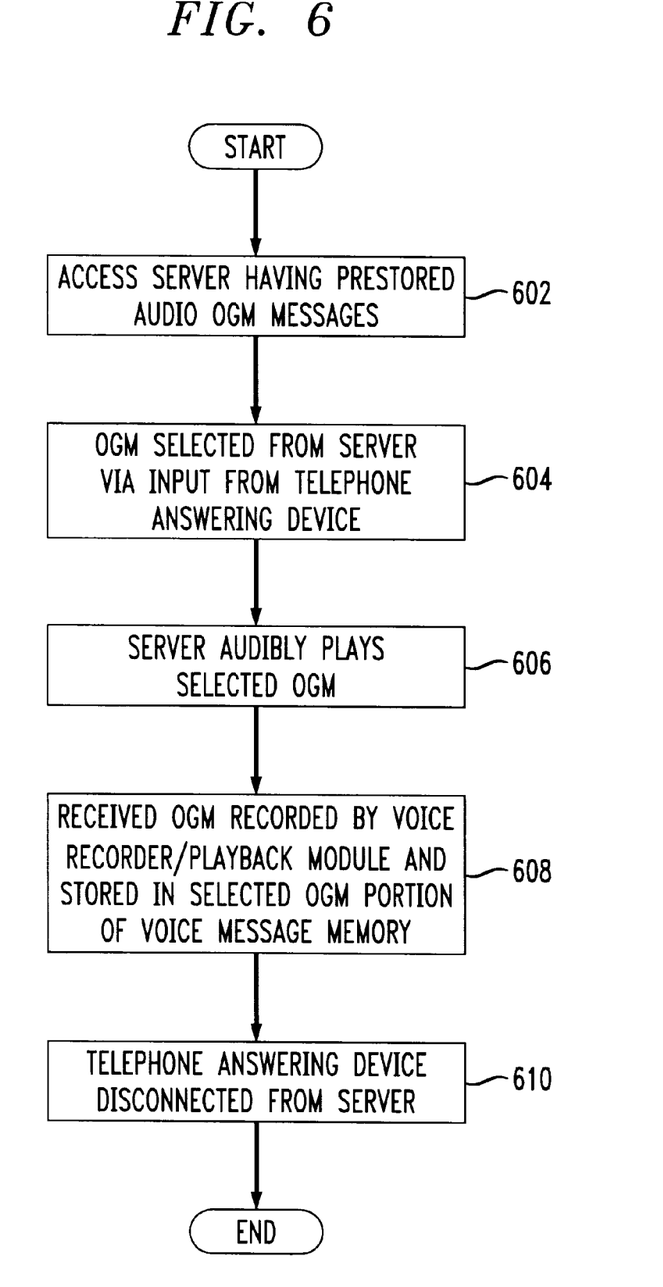
FIG. 6 is a flow chart illustrating a process by which the user of the telephone answering device can access, select, and download a pre-stored outgoing greeting message in accordance with the principles of the present invention.

FIG. 6 shows an exemplary process of accessing, selecting, and downloading an audible outgoing greeting message in audible, analog format using an appropriate telephone answering device such as the one shown in FIG. 4.

In particular, in step 602, the user first accesses the outgoing greeting message audio player 52 via instruction input to the keypad 26, e.g., by dialing an appropriate telephone number and any necessary access or menu codes.

In step 604, the user is preferably audibly instructed of the possible choices and/or example playbacks of the possible choices over the speaker 32. In response, the user selects the desired outgoing greeting message for playback by the external outgoing greeting message audio player 52 and storage in digital format in the selected outgoing greeting message 42 portion of the voice message memory 30. The audible, analog outgoing greeting message is appropriately digitized in the voice recorder/playback module 18 as are any voice messages received by any caller.

In step 606, the outgoing greeting message audio player 52 then audibly plays the selected outgoing greeting message.

Simultaneously with step 606, or thereafter, the received outgoing greeting message is recorded in step 608 by the voice recorder/playback module 18 in the selected outgoing greeting message portion 42 of the voice message memory 30.

In step 608, the telephone answering device 10 is disconnected from the outgoing greeting message audio player 52, and the telephone call terminated. The telephone answering device 10 then resets itself for use as an otherwise conventional telephone answering device 10 which answers calls after a predetermined number of rings and allows a calling party to record a voice message.

The present invention offers the user of a voice messaging system an opportunity to customize the outgoing greeting message for his or her particular telephone answering device 10 based on their own needs and personality with any of a virtually endless selectable, pre-stored outgoing greeting message downloaded from an external source.

While the invention has been described with reference to the exemplary embodiments thereof, those skilled in the art will be able to make various modifications to the described embodiments of the invention without departing from the true spirit and scope of the invention.

What is claimed is:

1. A outgoing greeting message module for a telephone answering device, comprising:

a controller adapted to gain access over a telephone line to a plurality of pre-recorded outgoing greeting messages;

an outgoing greeting message memory location adapted to store a digital representation of a selected one of said pre-recorded outgoing greeting message; and an outgoing greeting message download module adapted to download over said telephone line said selected one of said plurality of pre-recorded outgoing greeting messages for storage directly in said outgoing greeting message memory location.

2. The outgoing greeting message module for a telephone answering device according to claim 1, wherein:

said outgoing greeting message memory location is non-volatile.

3. The outgoing greeting message module for a telephone answering device according to claim 1, wherein:

said outgoing greeting message download module is adapted to download said selected one of said plurality of pre-recorded outgoing greeting messages in a digital format.

4. The outgoing greeting message module for a telephone answering device according to claim 1, wherein:

said outgoing greeting message download module is adapted to download said selected one of said plurality of pre-recorded outgoing greeting messages in an analog format, and to cause digitization of said selected one of said plurality of pre-recorded outgoing greeting messages for storage directly in said outgoing greeting message memory location.

5. The outgoing greeting message module for a telephone answering device according to claim 1, further comprising:

a modem to allow digital transfer of said selected one of said plurality of pre-recorded outgoing greeting messages to said telephone answering device.

6. The outgoing greeting message module for a telephone answering device according to claim 1, wherein:

said plurality of pre-recorded outgoing greeting messages include celebrity voices.

7. A method of accessing, selecting, and downloading a pre-recorded digital outgoing greeting message with a telephone answering device from an external source, said method comprising:

accessing over a telephone line a plurality of pre-recorded outgoing greeting messages at said external source;

selecting from said telephone answering device one of said plurality of pre-recorded outgoing greeting messages at said external source; and downloading said selected outgoing greeting messages from said external source over said telephone line directly to an outgoing greeting message memory.

8. The method of accessing, selecting, and downloading a pre-recorded digital outgoing greeting message with a telephone answering device from an external source according to claim 7, wherein:

said downloading is performed using a digital format.

9. The method of accessing, selecting, and downloading a pre-recorded digital outgoing greeting message with a telephone answering device from an external source according to claim 7, wherein:

said downloading is performed using an analog format.

10. The method of accessing, selecting, and downloading a pre-recorded digital outgoing greeting message with a telephone answering device from an external source according to claim 7, wherein:

said external source includes a server.

11. The method of accessing, selecting, and downloading a pre-recorded digital outgoing greeting message with a telephone answering device from an external source according to claim 10, wherein:

said server is an Internet Protocol server.

12. The method of accessing, selecting, and downloading a pre-recorded digital outgoing greeting message with a telephone answering device from an external source according to claim 7, wherein:

said access is provided via an Internet.

13. The method of accessing, selecting, and downloading a pre-recorded digital outgoing greeting message with a telephone answering device from an external source according to claim 7, wherein:

said access includes use of a modem in said telephone answering device.

14. The method of accessing, selecting, and downloading a pre-recorded digital outgoing greeting message with a telephone answering device from an external source according to claim 7, wherein:

said plurality of pre-recorded outgoing greeting messages include celebrity voices.

15. The method of accessing, selecting, and downloading a pre-recorded digital outgoing greeting message with a telephone answering device from an external source according to claim 7, wherein:

said step of selecting utilizes keys and a display at said telephone answering device.

16. The method of accessing, selecting, and downloading a pre-recorded digital outgoing greeting message with a telephone answering device from an external source according to claim 7, further comprising:

storing a selected outgoing greeting message in non-volatile memory in said telephone answering device.

17. The method of accessing, selecting, and downloading a pre-recorded digital outgoing greeting message with a telephone answering device from an external source according to claim 7, further comprising:

digitizing said selected one of said plurality of outgoing greeting messages in said telephone answering device.

18. Apparatus for accessing, selecting, and downloading a pre-recorded digital outgoing greeting message with a telephone answering device from an external source, comprising:

means for accessing a plurality of pre-recorded outgoing greeting messages over a telephone line at said external source;

means for selecting from said telephone answering device one of said plurality of pre-recorded outgoing greeting messages at said external source; and means for downloading said selected outgoing greeting messages from said external source over said telephone line directly to an outgoing greeting message memory.

19. The apparatus for accessing, selecting, and downloading a pre-recorded digital outgoing greeting message with a telephone answering device from an external source according to claim 18, wherein:

said means for downloading downloads said pre-recorded selected outgoing greeting message utilizing a digital format.

20. The apparatus for accessing, selecting, and downloading a pre-recorded digital outgoing greeting message with a telephone answering device from an external source according to claim 18, wherein:

said means for downloading downloads said pre-recorded selected outgoing greeting message utilizing an analog format.

21. The apparatus for accessing, selecting, and downloading a pre-recorded digital outgoing greeting message with a telephone answering device from an external source according to claim 18, wherein said external source includes:

a server.

22. The apparatus for accessing, selecting, and downloading a pre-recorded digital outgoing greeting message with a telephone answering device from an external source according to claim 21, wherein:

said server is an Internet Protocol server.

23. The apparatus for accessing, selecting, and downloading a pre-recorded digital outgoing greeting message with a telephone answering device from an external source according to claim 18, wherein:

said access includes use of an Internet.

24. The apparatus for accessing, selecting, and downloading a pre-recorded digital outgoing greeting message with a telephone answering device from an external source according to claim 18, further comprising:

a modem.

25. The apparatus for accessing, selecting, and downloading a pre-recorded digital outgoing greeting message with a telephone answering device from an external source according to claim 18, wherein:

said plurality of pre-recorded outgoing greeting messages include celebrity voices.

26. The apparatus for accessing, selecting, and downloading a pre-recorded digital outgoing greeting message with a telephone answering device from an external source according to claim 18, further comprising:

non-volatile memory in said telephone answering device for digital storage of said selected outgoing greeting message.

27. The apparatus for accessing, selecting, and downloading a pre-recorded digital outgoing greeting message with a telephone answering device from an external source according to claim 18, further comprising:

means for digitizing said selected one of said plurality of outgoing greeting messages in said telephone answering device.

28. A method of allowing selection of and downloading a digital outgoing greeting message to a telephone voice mail system from an external server, said method comprising:

assembling a plurality of pre-recorded outgoing greeting messages at said external server;

allowing an incoming caller to select one of said plurality of pre-recorded outgoing greeting messages at said external server; and downloading said selected outgoing greeting messages from said external server directly to an outgoing greeting message memory of said voice mail system.

29. The method of allowing selection of and downloading a digital outgoing greeting message to a telephone answering device from an external server according to claim 28, wherein:

at least one of said pre-recorded outgoing greeting messages at said external server is custom designed for a particular user.

* * * * *